United States Patent
Mohseni et al.

(10) Patent No.: US 7,046,701 B2
(45) Date of Patent: May 16, 2006

(54) SYSTEM, METHOD, AND APPARATUS FOR FRACTIONAL DELAY

(75) Inventors: Mohammad J. Mohseni, San Diego, CA (US); Brian K. Butler, La Jolla, CA (US); Deepu John, San Diego, CA (US); Haitao Zhang, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 929 days.

(21) Appl. No.: 09/973,249

(22) Filed: Oct. 9, 2001

(65) Prior Publication Data

US 2002/0150128 A1   Oct. 17, 2002

Related U.S. Application Data

(60) Provisional application No. 60/245,231, filed on Nov. 3, 2000.

(51) Int. Cl.
    *H04J 3/02* (2006.01)
(52) U.S. Cl. ............... 370/537; 370/204; 370/532; 370/535

(58) Field of Classification Search ............... 370/204, 370/205, 211, 527, 532, 533, 529, 535, 537
See application file for complete search history.

(56) References Cited

U.S. PATENT DOCUMENTS

| | | | | |
|---|---|---|---|---|
| 4,723,237 | A | * | 2/1988 | Andrew et al. ............ 370/204 |
| 5,408,474 | A | * | 4/1995 | Wakamori et al. ......... 370/493 |
| 5,481,643 | A | * | 1/1996 | Ten Kate et al. ........... 704/227 |
| 6,377,613 | B1 | * | 4/2002 | Kawabe et al. ............ 375/142 |

* cited by examiner

*Primary Examiner*—Ricky Q. Ngo
*Assistant Examiner*—Nguyen H. Ngo
(74) *Attorney, Agent, or Firm*—Philip R. Wadsworth; Charles D. Brown; George C. Poppas

(57) ABSTRACT

A composite signal has two components, each carrying a stream of information that may be digital. In one application of a method according to an embodiment of the invention, at least one of the components is delayed such that a time relation between the streams of information is altered. The components are transferred via a common signal path such that upon transfer, the original time relation between the streams of information may be restored.

18 Claims, 20 Drawing Sheets

SYSTEM, METHOD, AND APPARATUS FOR FRACTIONAL DELAY

RELATED APPLICATIONS

This application claims priority to U.S. Provisional Patent Application No. 60/245,231, entitled "SYSTEM, METHOD, AND APPARATUS FOR SUBSAMPLE DELAY," filed Nov. 3, 2000 and assigned to the assignee of the present application.

BACKGROUND

1. Field of the Invention

The invention relates to processing of information signals.

2. Background Information

A composite signal has two or more components whose values are related in time. Such signals are frequently encountered in communications applications. In an audio application, for example, a stereo signal may have a first component whose value over time defines the left channel of the signal and a second component whose value over time defines the right channel of the signal and is related in time to that of the first component.

Similarly, in a radio-frequency application, a composite signal that carries a baseband signal for modulation onto a carrier may have two components: a first component whose values over time define a data stream to be modulated onto the I (in-phase) component of the carrier, and a second component whose values over time define a data stream to be modulated onto the Q (quadrature) component of the carrier and are related in time to those of the first component.

In these and other instances, the components of a composite signal may describe a number of time-varying processes that are related in time, or two or more of the components may describe different aspects of a single time-varying process. In either case, a time relation between the components of a composite signal conveys essential information. For example, if the time relation between the components of a stereo signal is lost (e.g. because one component is delayed during transmission by an unknown period relative to the other component), the signal will not be reproduced correctly.

Likewise, a time relation between the components of a composite signal in a radio-frequency application may convey essential information. In one such example, the co-pending U.S. patent application Ser. No. 09/452,045, entitled "METHOD AND APPARATUS FOR ROTATING THE PHASE OF A COMPLEX PSK SIGNAL," filed Nov. 30, 1999 and assigned to the assignee of the present application, describes methods of combining the I and Q components to perform an operation such as rotating the phase angle of a complex signal (e.g. to effectively exploit the dynamic range of a subsequent processing stage). If one of the components is delayed relative to the other, the phase angle will be altered and the desired effect may be lost. In transferring a composite signal between stages of a processing system, therefore, it is important to preserve the time relation between the components.

In many applications, it is desirable to implement successive stages of a processing path using physically distinct assemblies, printed circuit boards, chips, or components, or physically distinct regions of such units. In such cases, it may become necessary or desirable to transfer a composite signal between stages over a signal path (e.g. pins on a chip, a circuit bus, or a frequency band of a wireless transmission channel) that can only accommodate the values of fewer than all of the components at once. For example, it may be necessary or desirable to limit the number of terminal connections (e.g. pins) on a chip package, to limit the number of traces in a circuit bus, or to limit a number of frequency channels such that only a reduced signal path is available to carry a composite signal. It is desirable to transfer a composite signal over a reduced signal path without affecting the time relation between the signal's components.

SUMMARY

A method according to one embodiment of the invention includes receiving a composite signal having a first component and a second component. The first component includes a value during each of a series of time periods, and the second component includes a value having a first time relation to a corresponding value of the first component during each of the series of time periods. In one example, the series of time periods comprises a series of consecutive time periods of equal duration. In another example, a boundary between each of the series of time periods is defined by a transition of a clock signal, which may have a duty cycle substantially equal to fifty percent.

A delayed second component is produced that includes, during each of the series of time periods, a value having a second time relation to a corresponding value of the first component. In one example, the value of the delayed second component during a time period is based on (A) the value of the second component during the time period and (B) the value of the second component during at least one time period adjacent to the time period. In another example, a difference between the second time relation and the first time relation is measured in durations of a time period and includes an integer portion and a nonzero fractional portion, where the fractional portion is at least one-quarter and no greater than three-quarters (e.g. substantially equal to one-half) of a time period.

The values of the delayed second component and the values of a component based on the first component are multiplexed onto a common signal path. In one example, the values multiplexed onto the common signal path are n bits wide, and the common signal path is less than 2n bits wide (e.g. n bits wide). Further examples of such a method include producing a delayed first component based on the first component and having an integer delay with respect to the first component, where the values of the delayed second component and the values of the delayed first component are multiplexed onto the common signal path.

Other methods according to embodiments of the invention as described herein may include demultiplexing values from the common signal path to produce a transferred first component based on the first component and a transferred second component based on the second component. Methods according to further such embodiments may include modulating a carrier with components based on the transferred components and/or producing analog components based on the transferred components. Methods according to other embodiments of the invention as described herein may include tasks relating to components having these and/or other features. Devices and systems according to embodiments of the invention that may include these and/or other features are also described herein.

DETAILED DESCRIPTION

Figure 1:
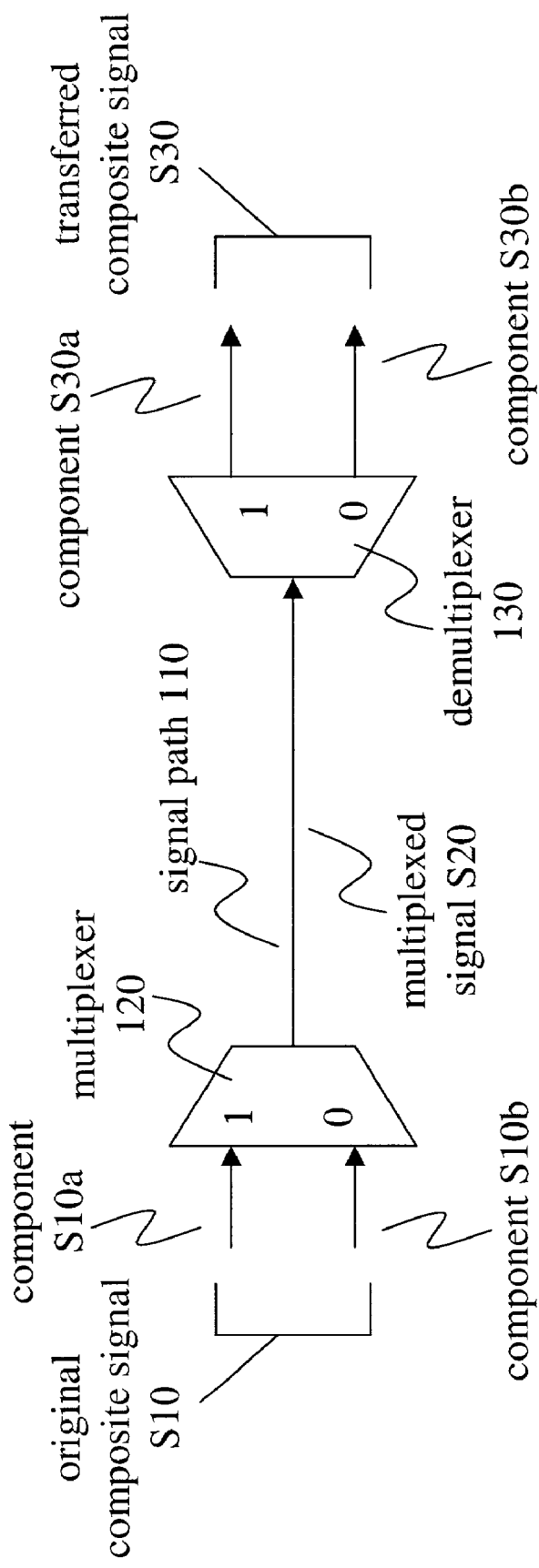
FIG. 1 is a block diagram of a system including a multiplexer.

FIG. 1 shows an example of a system in which a multiplexer 120 multiplexes two components S10a and S10b of an original composite signal S10 to produce multiplexed signal S20. Signal S20 is transferred over signal path 110 to demultiplexer 130, which demultiplexes signal S20 to produce a transferred composite signal S30 having components S30a and S30b. In one implementation of such a system, components S10a and S10b have digital values that are n bits wide and are synchronized to a clock signal CLK (not shown in FIG. 1), and signal path 110 is an n-bit-wide bus (including, e.g., n pins of a chip and/or n traces on a printed circuit board).

Figure 2:
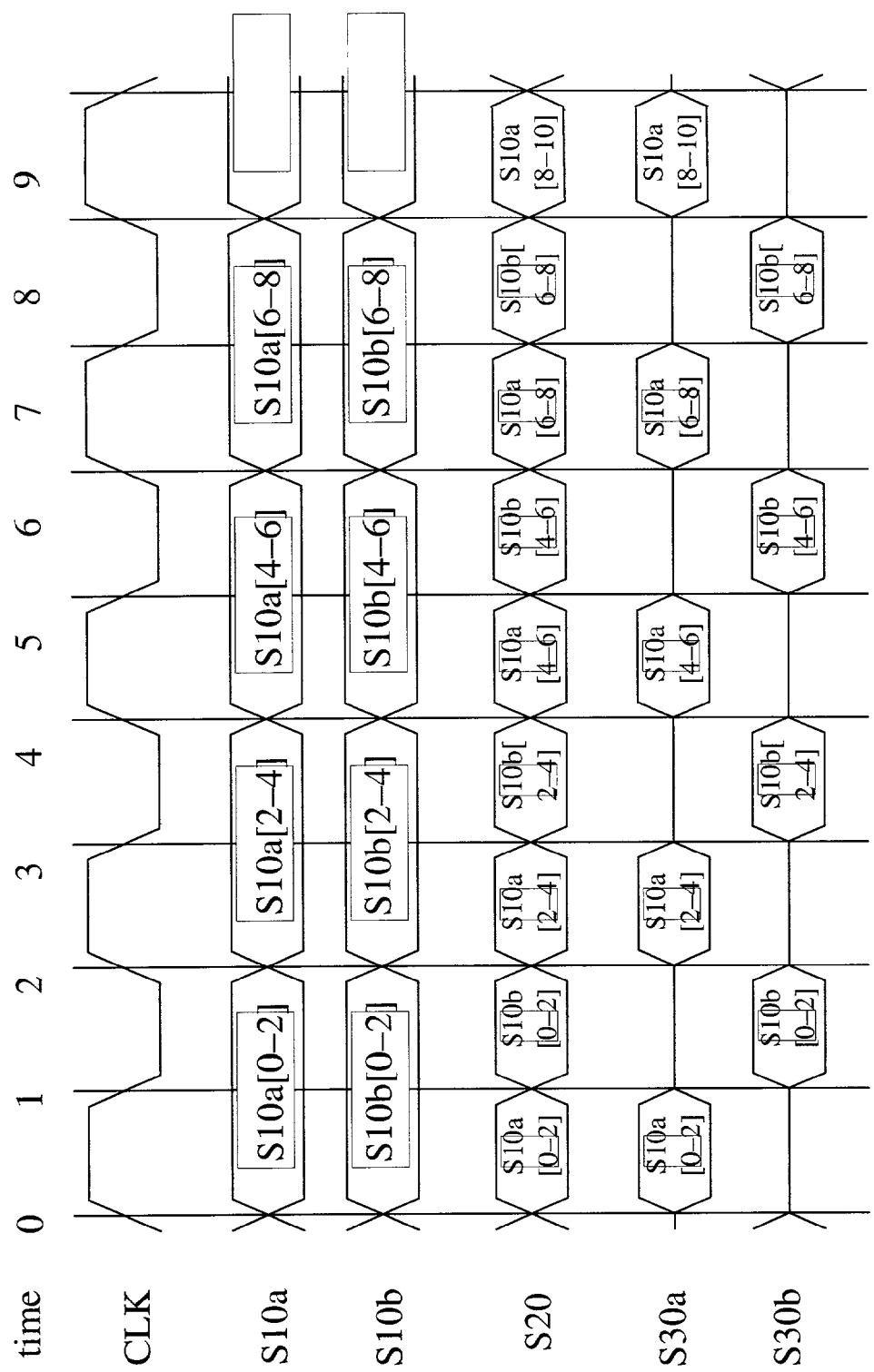
FIG. 2 is a timing diagram of a system as shown in FIG. 1.

FIG. 2 shows a timing diagram for a system as shown in FIG. 1. In this example, the values of the components are constant over substantially the entire corresponding time period (e.g. except for a brief settling period near the clock period boundaries when the values of the components may be undefined). The signals and components in FIG. 2 are labeled to indicate a time relation between the values of components S10a and S10b. For example, the value of component S10a labeled 'S10a[0–2]' corresponds to the value of component S10b labeled 'S10b[0–2]'.

For convenience, the labels of the values of original composite signal S10 in FIG. 2 correspond to the time periods at which they appear on the components S10a and S10b. In general, and depending on the application, the label values may indicate a relation of each component to a predetermined reference time mark (e.g. as in FIG. 2). Alternatively, the label values may be chosen with respect to a common but arbitrary reference, such that the time relation between the values of the components is indicated by the relation between the label values and not by the labels' absolute values.

Figure 3:
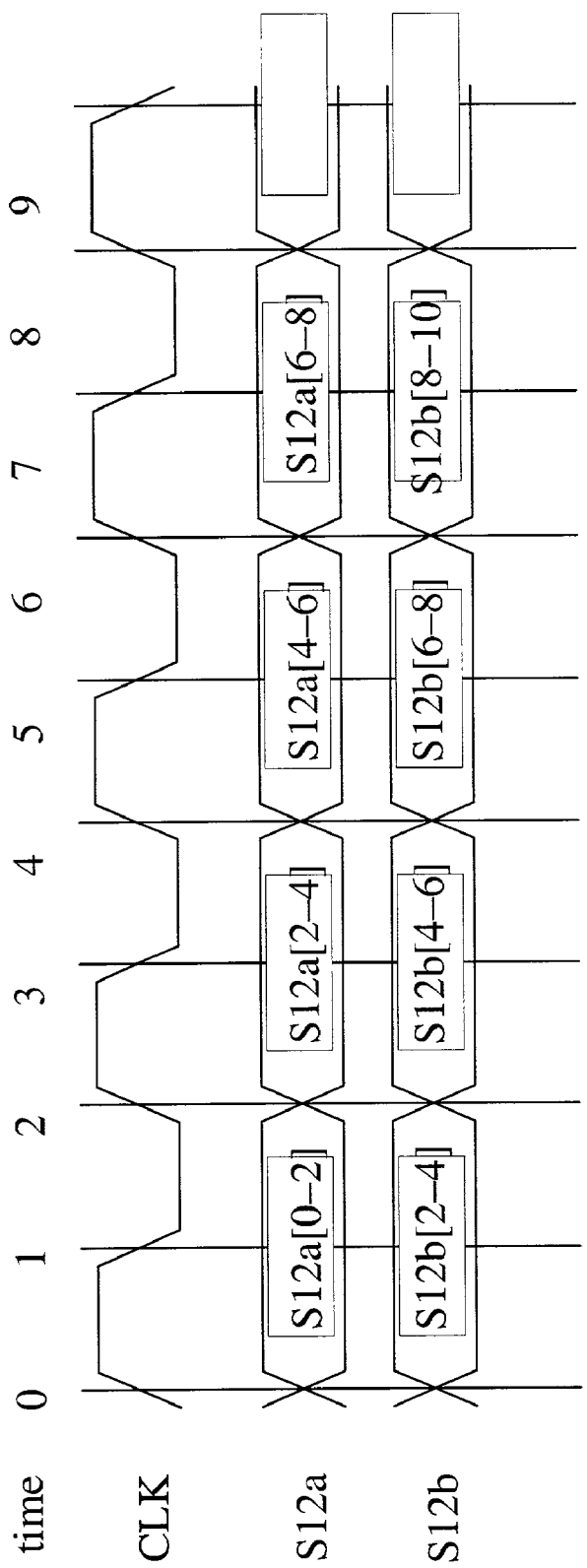
FIG. 3 is a timing diagram of a system as shown in FIG. 1.

FIG. 3 shows another example in which values that are related to one another in time appear on the various components S12a, S12b of an original composite signal S12 during different periods. Specifically, each value of component S12b (e.g. the value appearing during the time period marked 0–2) is related in time to the value of component S12a that appears two time marks later (the value appearing during the time period marked 2–4). Therefore, the time relation between corresponding values of components S12a and S12b as shown in FIG. 3 (i.e. a nonzero offset in time) differs from the time relation between corresponding values of components S10a and S10b as shown in FIG. 2 (i.e. a zero offset in time).

Embodiments of the invention as described herein may be employed to preserve the original time relation after transfer of a composite signal over a common signal path in cases where the original time relation is a zero offset as well as in cases where the original time relation is a nonzero offset. One example of a zero-offset time relation is the relation between the left and right components of a stereo audio signal. One example of a nonzero-offset time relation is the relation between the I and Q components of a OQPSK (offset quadrature phase-shift keying) signal.

Figure 4:
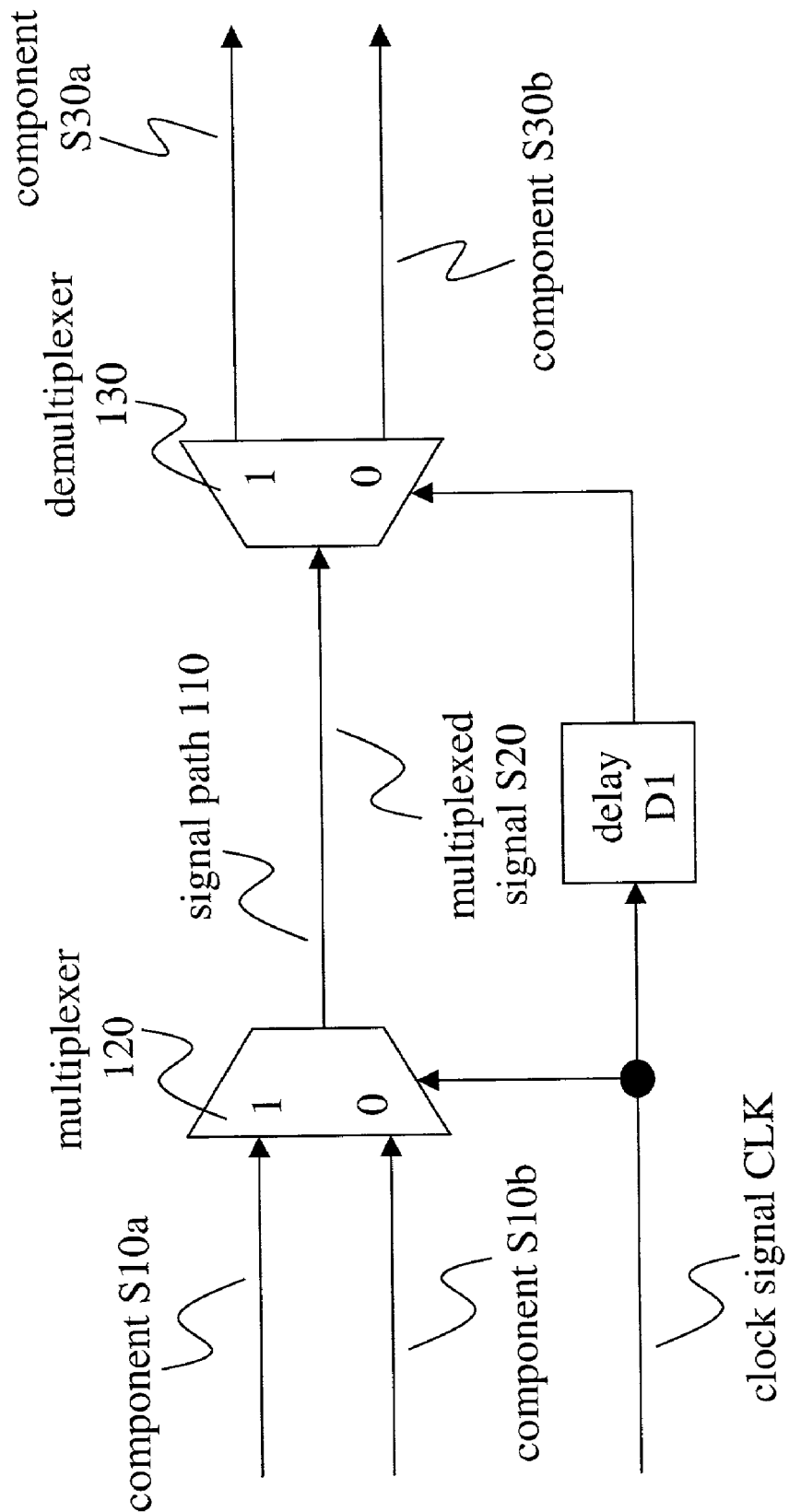
FIG. 4 is a diagram showing a distribution of a clock signal CLK in a system as shown in FIG. 1.

FIG. 4 shows a distribution of clock signal CLK within a system as shown in FIG. 1. The control (or 'select') input of multiplexer 120 is driven by clock signal CLK (or a signal based on clock signal CLK) to produce signal S20, whose value alternates over time between those of components S10a and S10b as shown in FIG. 2. In a case where the values of one of components S10a and S10b change at a rate that is higher than (e.g. a multiple of) the rate at which the values of the other component change, it may be desirable to drive the select input of multiplexer 120 using a signal having a frequency that is twice the fastest rate of change among the components S10a and S10b.

The control input of demultiplexer 130 is driven synchronously to that of multiplexer 120 to produce components S30a and S30b from signal S20. Clocking of the select input of demultiplexer 130 may be delayed slightly with respect to clocking of the select input of multiplexer 120. For example, a delay D1 of the signal CLK between these two inputs may be expected (e.g. as being inherent to the application) and/or may be purposely introduced (e.g. to allow input settling or for purposes of synchronization). The duration of such a delay may depend in part on an expected propagation delay between multiplexer 120 and demultiplexer 130 (especially in a case where signal path 110 has an appreciable length). For clarity and convenience, effects of such delays are ignored in the timing diagrams.

It may be seen in the timing diagram of FIG. 2 that the time relation between the components of transferred composite signal S30 is different than the time relation between the components of original composite signal S10. Specifically, in signal S10 values that are related in time appear on the respective components at the same time and during the same periods, while in signal S30 the values of component S30b that are related in time to values of component S30a lag behind those values by a delay of one time mark.

Figure 5:
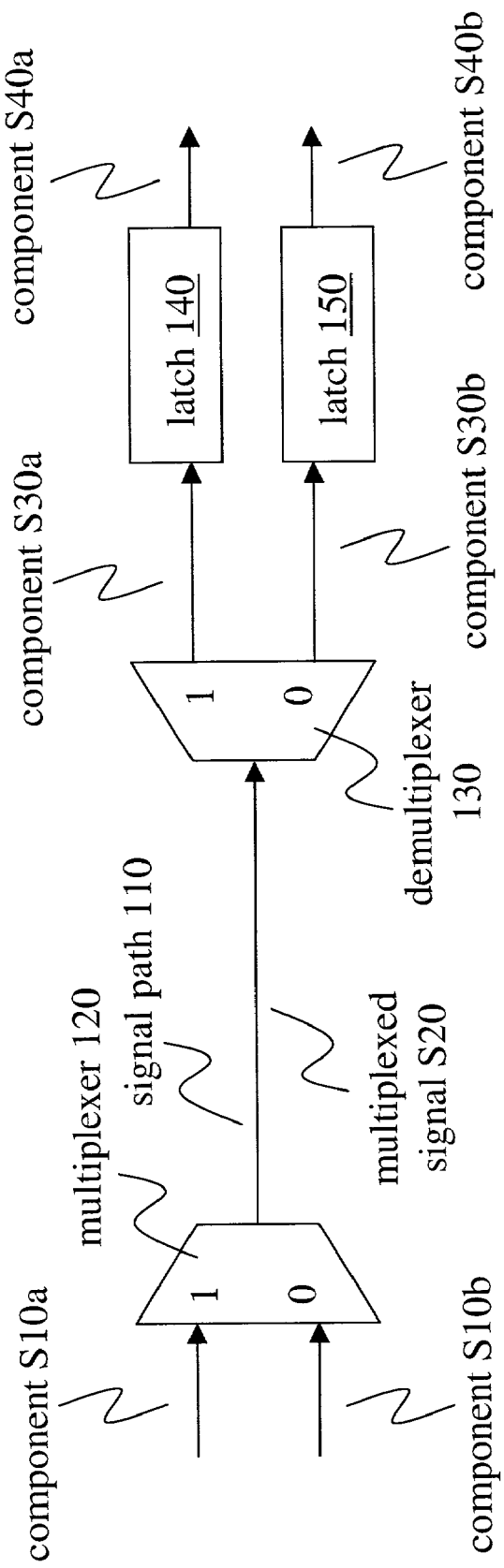
FIG. 5 is a block diagram of a system including latches.

FIG. 5 shows a further application of a system as shown in FIG. 1. Latches 140 and 150 receive the components S30a and S30b, respectively, and maintain the values on these signals over a period of two time marks (i.e. one period of clock signal CLK) to produce components S40a and S40b of a composite signal S40. In other examples, demultiplexer 130 may incorporate a latch at each output or may otherwise include a sample-and-hold operation.

Figure 6:
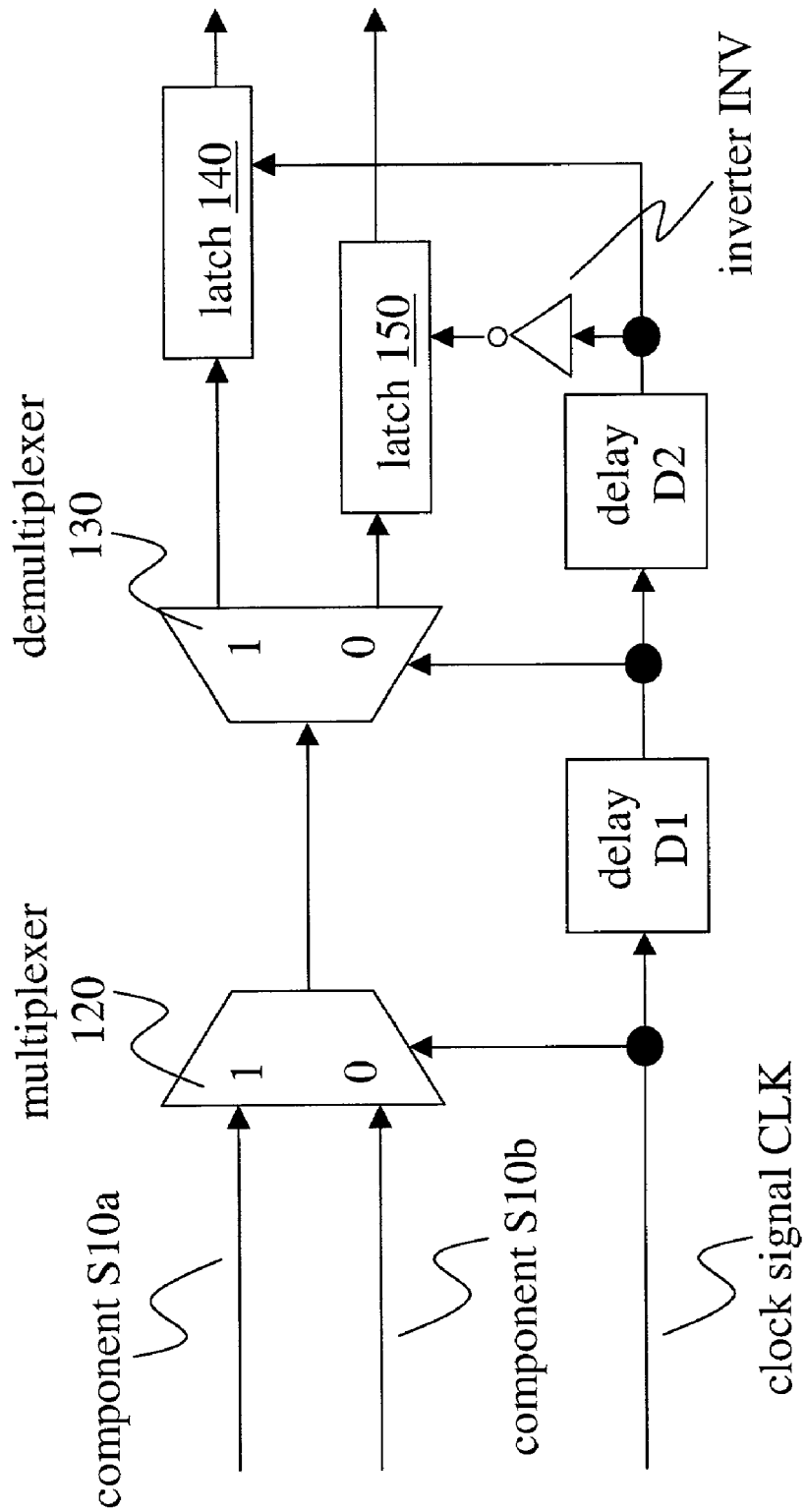
FIG. 6 is a diagram showing a distribution of a clock signal CLK in a system as shown in FIG. 5.

FIG. 6 shows a distribution of clock signal CLK within a system as shown in FIG. 5. The load inputs of latches 140 and 150 are driven synchronously to the select inputs of multiplexer 120 and demultiplexer 130, with the signal to the load input of latch 150 being inverted (e.g. by inverter INV) with respect to the signal to the load input of latch 140. Clocking of the load inputs of latches 140 and 150 may be delayed slightly with respect to clocking of the select inputs of multiplexer 120 and/or demultiplexer 130. For example, a delay D2 of the signal CLK as shown in FIG. 6 may be expected (e.g. as being inherent to the application) and/or may be purposely introduced (e.g. to allow input settling or for purposes of synchronization). For clarity and convenience, effects of such delays are ignored in the timing diagrams.

Figure 7:
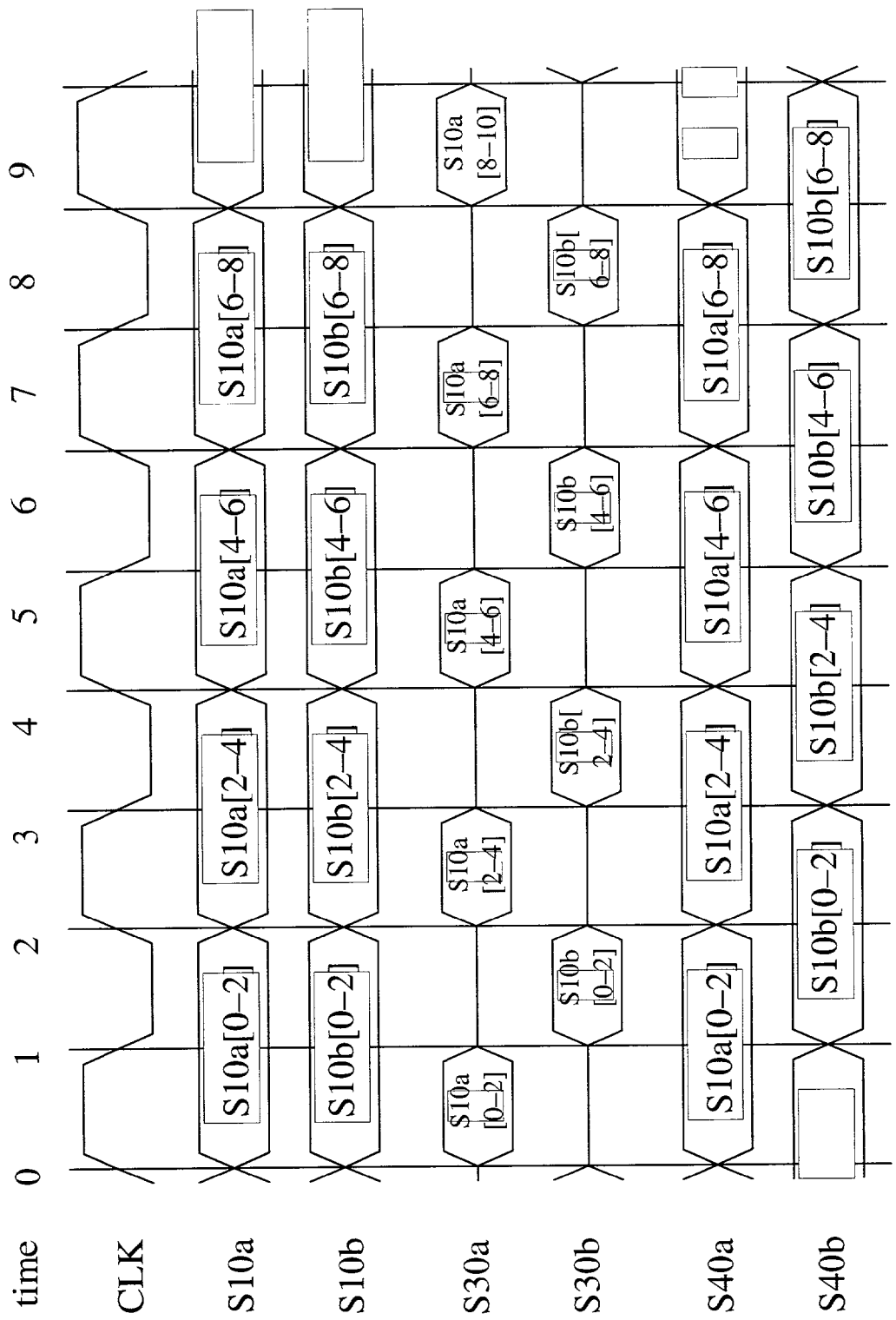
FIG. 7 is a timing diagram of a system as shown in FIG. 5.

FIG. 7 shows a timing diagram of a system as shown in FIG. 5. It may be seen that each value of composite signal S40 has the same duration as each value of original composite signal S10 (i.e. a period of two time marks). As noted above with respect to composite signal S30, however, the values of the components of signal S40 do not have the same time relation as the values of the components of original composite signal S10. Specifically, in signal S10 values that are related in time appear on the respective components at the same time and during the same periods, while the values of component S40b that are related in time to values of component S40a lag behind those values by a delay of one time mark.

Such a difference between the time relation of the values of an original composite signal and the time relation of the values of a transferred composite signal may cause an undesired result in a subsequent processing stage. Although a buffering scheme may be used in some situations to restore a correct time relation between the values of the components of the transferred signal, in other applications such an option may not be available or desirable. For example, performing such an operation on the transferred composite signal may introduce additional costs of assembly (e.g. parts and fabrication). Chip or board area may not be available to accommodate such a scheme, or it may be otherwise undesirable or inconvenient to incorporate such circuitry into a particular application.

Figure 8:
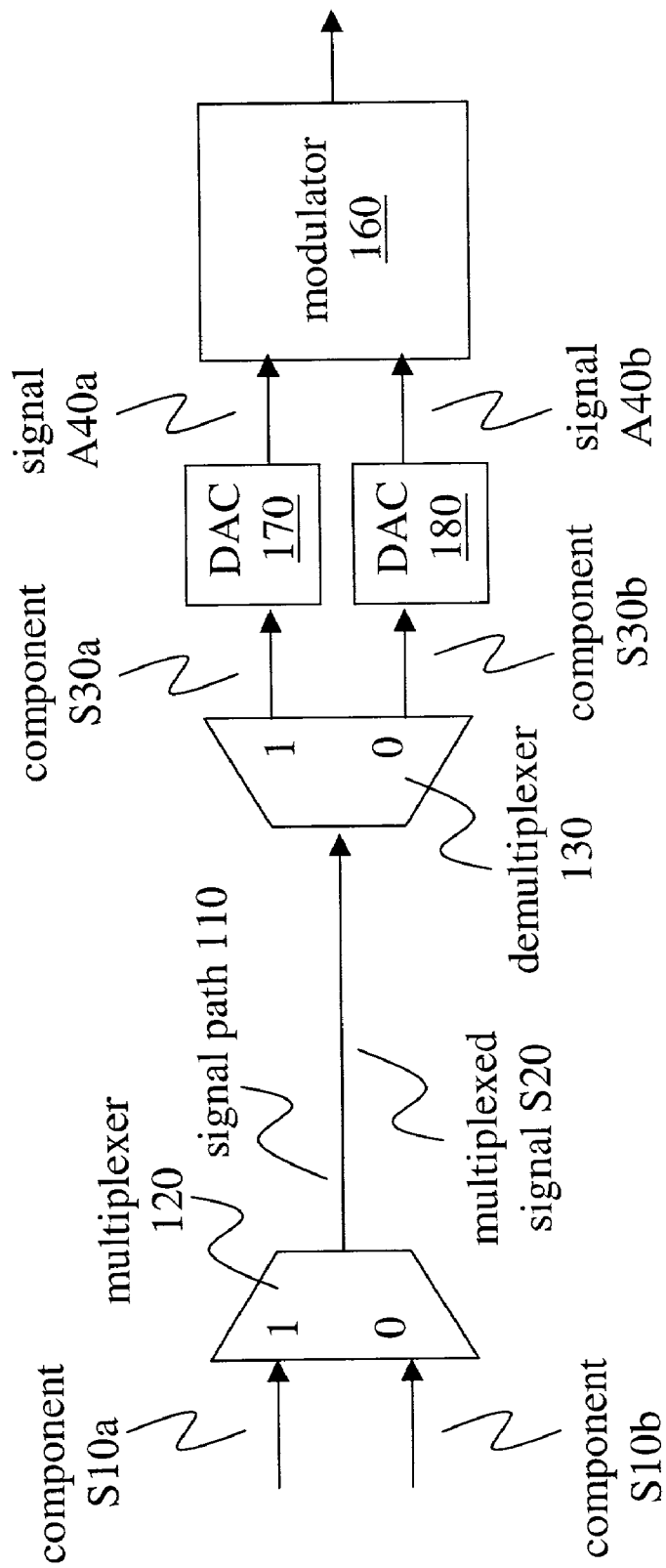
FIG. 8 is a block diagram of a system including a modulator.

FIG. 8 shows an example of a system in which a loss of the original time relation between the values of components S10a and S10b may produce an undesired result or otherwise adversely affect system performance. In this system, digital-to-analog converters (DACs) 170 and 180 are driven (e.g. as latches 140 and 150 are driven in FIG. 6) to latch and convert values outputted by demultiplexer 130 to produce components A40a and A40b, respectively, of an analog composite signal A40. Modulator 160 receives the analog composite signal A40 and modulates its components onto the I and Q components, respectively, of a carrier signal. Operations performed by modulator 160 may also include pulse-shaping or otherwise filtering composite signal A40 before modulation.

Figure 9:
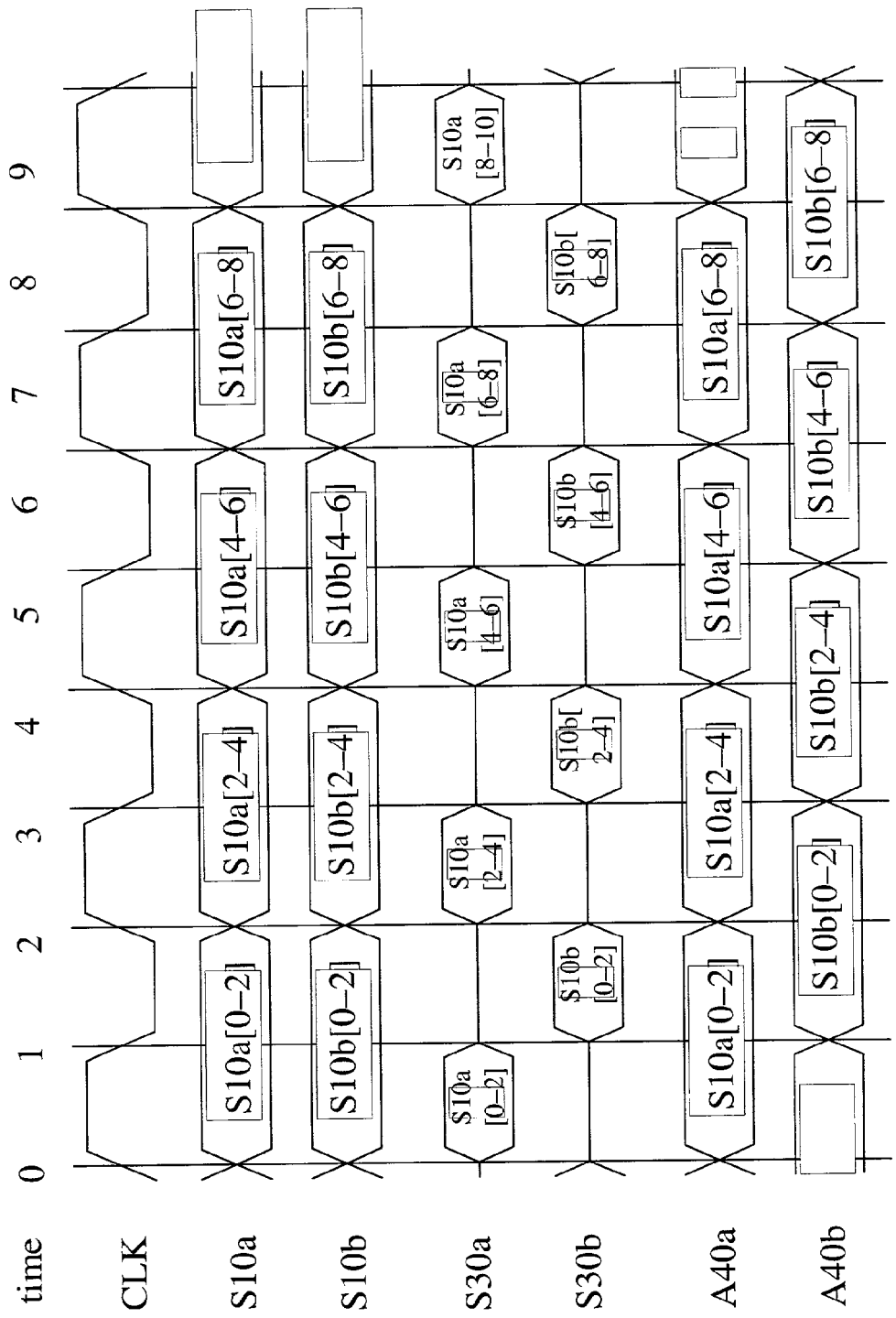
FIG. 9 is a timing diagram of a system as shown in FIG. 8.

FIG. 9 shows a timing diagram of a system as shown in FIG. 8. In a wireless communications application as described above, signal S10 may carry a series of phase vectors, each defined by an I value and a Q value appearing on components S10a and S10b, respectively, during the same clock period. If those values are received by modulator 160 in a different relative time relation (see, e.g., components A40a and A40b as shown in FIG. 9), the phase vectors of the signal that are used to modulate the carrier may not correspond to the intended vectors as carried by signal S10, and a desired performance may not be achieved.

Figure 10:
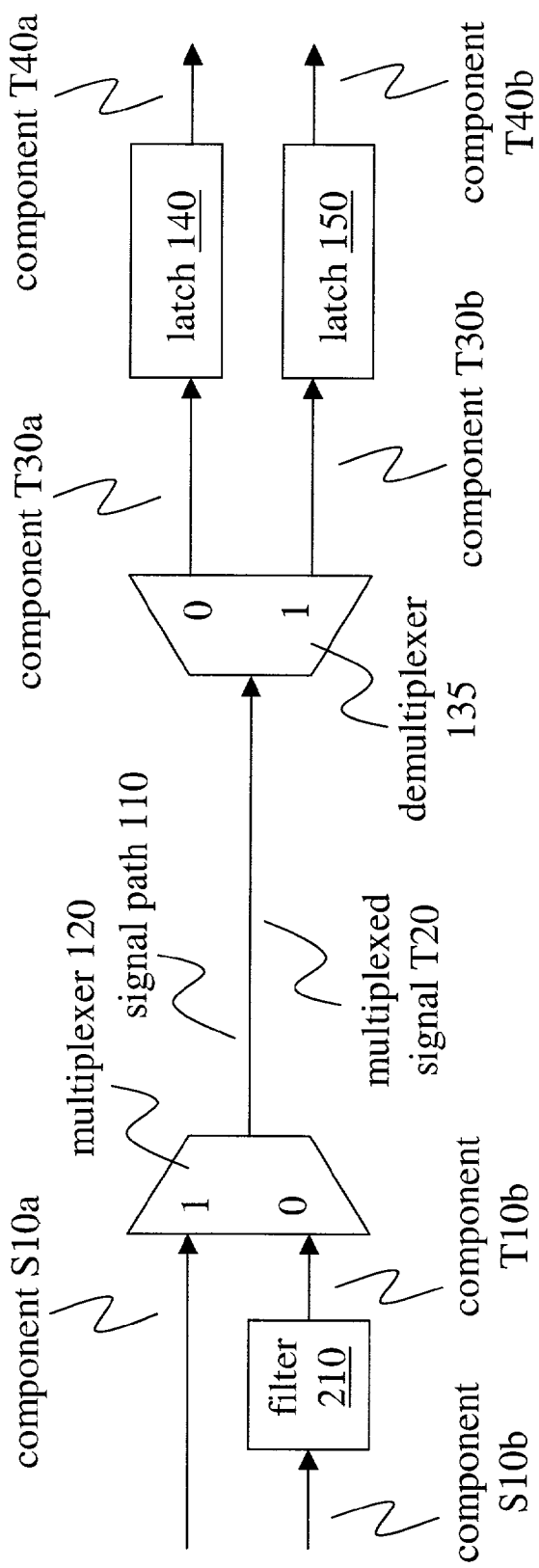
FIG. 10 is a block diagram of a system including a filter 210 according to an embodiment of the invention.

FIG. 10 shows a system including a filter 210 according to an embodiment of the invention. Filter 210 receives component S10b and produces a delayed component T10b that has a fractional delay (i.e. a delay having an integer portion and a non-zero fractional portion) with respect to component S10b. Specifically, filter 210 has a delay of one-half of a clock period (i.e. a delay having an integer portion of zero and a fractional portion of one half). In an exemplary embodiment, filter 210 produces component T10b by interpolation. For example, filter 210 may be a two-tap finite impulse response (FIR) filter. In a particular implementation, filter 210 is a FIR filter having an impulse response h(n) expressible as follows:

$$h(n) = \frac{x(n) + x(n-1)}{2},$$

where x(n) denotes the information value received at time mark n.

Figure 11:
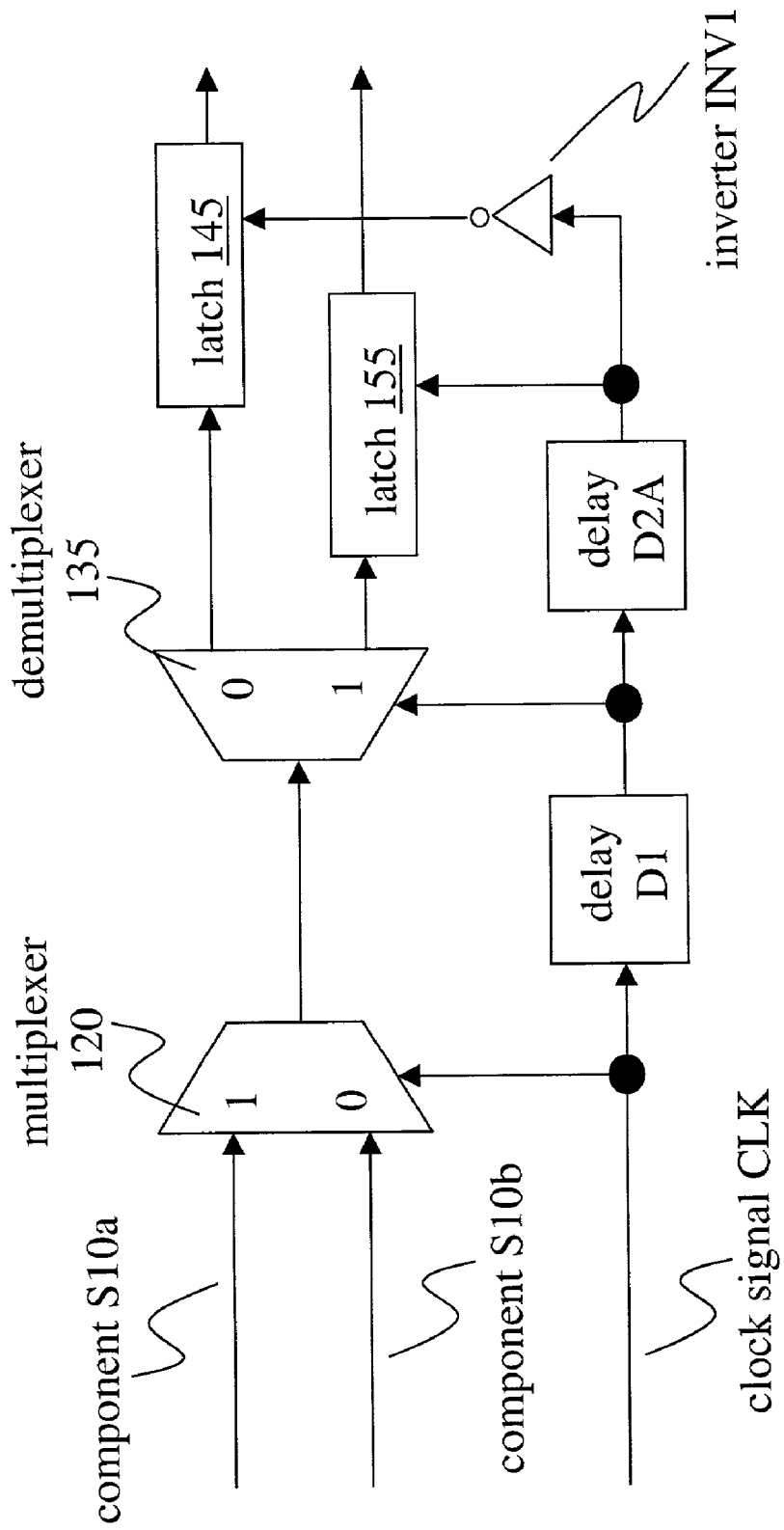
FIG. 11 is a diagram showing a distribution of a clock signal CLK in a system as shown in FIG. 10.

FIG. 11 shows a distribution of clock signal CLK within a system as shown in FIG. 10. The load inputs of latches 145 and 155 are driven synchronously to the select inputs of multiplexer 120 and demultiplexer 130, with the signal to the load input of latch 145 being inverted (e.g. by inverter INV1) with respect to the signal to the load input of latch 155. Clocking of the load inputs of latches 145 and 155 may be delayed slightly with respect to clocking of the select inputs of multiplexer 120 and/or demultiplexer 135. For example, a delay D2A of the signal CLK as shown in FIG. 11 may be expected (e.g. as being inherent to the application) and/or may be purposely introduced (e.g. to allow input settling or for purposes of synchronization). For clarity and convenience, effects of such delays are ignored in the timing diagrams.

Figure 12:
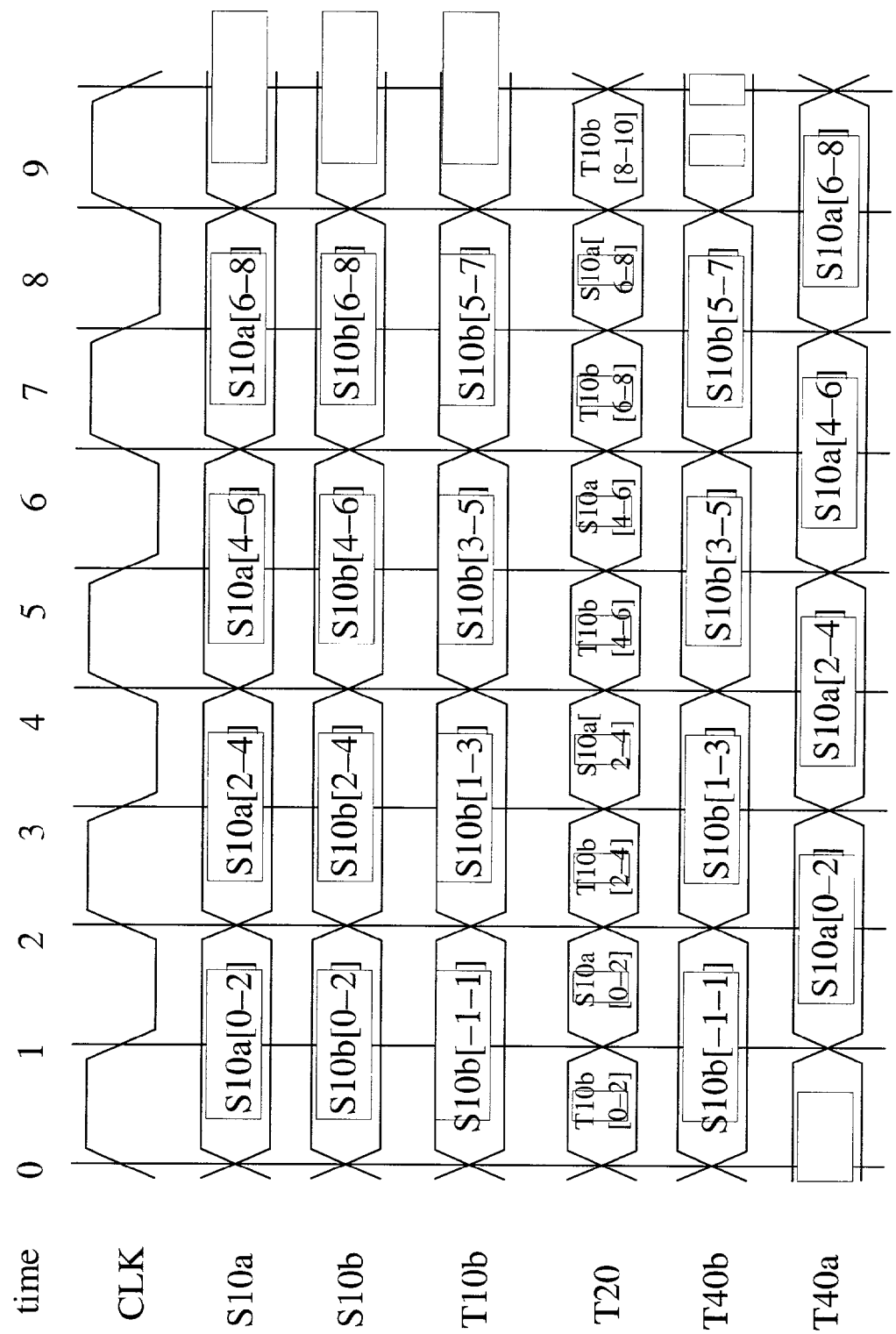
FIG. 12 is a timing diagram of a system as shown in FIG. 10.

FIG. 12 shows a timing diagram for a system as shown in FIG. 10. This figure demonstrates that like the values on components S10a, S10b, and T40b, the values on component T40a are synchronous to clock signal CLK, although the values on component T40a change at a different transition of clock signal CLK. Even so, the time relation between the information values carried by components T40a and T40b corresponds to the time relation between the information values carried by the components S10a and S10b of the original composite signal, as this figure also demonstrates. Therefore, in a system as shown in FIG. 10, the desired time relation between the values of the components is preserved after transfer of the composite signal across signal path 110. In the case of a two-component original composite signal, it may be desirable for the clock signal CLK to have a duty cycle substantially equal to 50% as shown in this figure.

Figure 13:
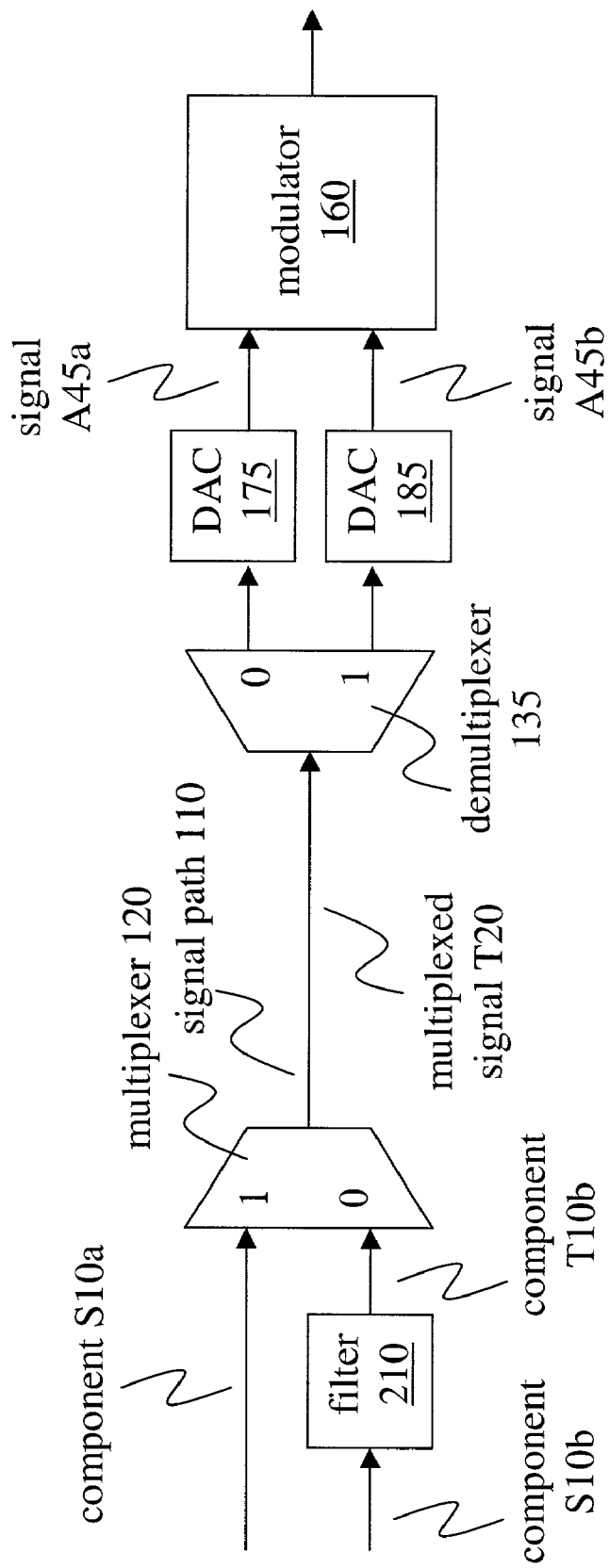
FIG. 13 is a block diagram of a system including a filter 210 according to an embodiment of the invention.

FIG. 13 shows another system including a filter 210 according to an embodiment of the invention. In this system, digital-to-analog converters (DACs) 175 and 185 are driven (e.g. as latches 145 and 155 are driven in FIG. 6) to latch and convert values outputted by demultiplexer 130 to produce components A45a and A45b, respectively, of an analog composite signal A45.

Figure 14:
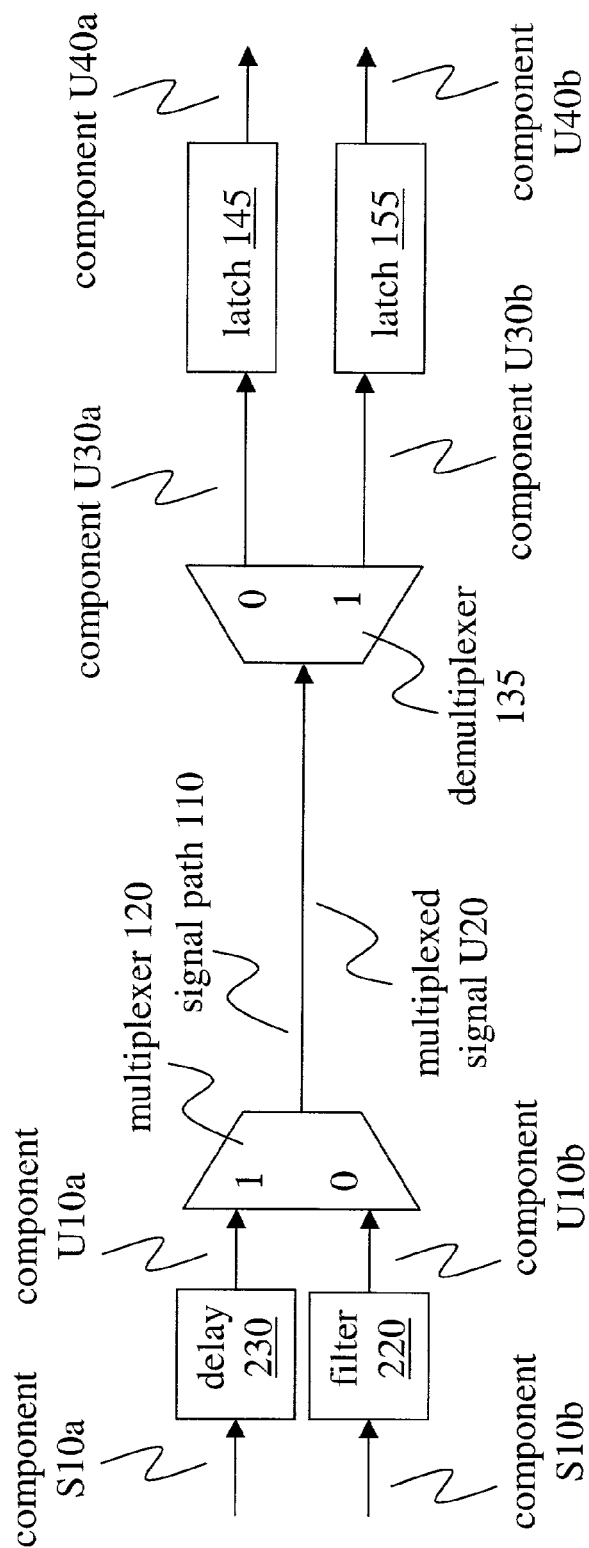
FIG. 14 is a block diagram of a system including a filter 220 according to an embodiment of the invention.
Figure 15:
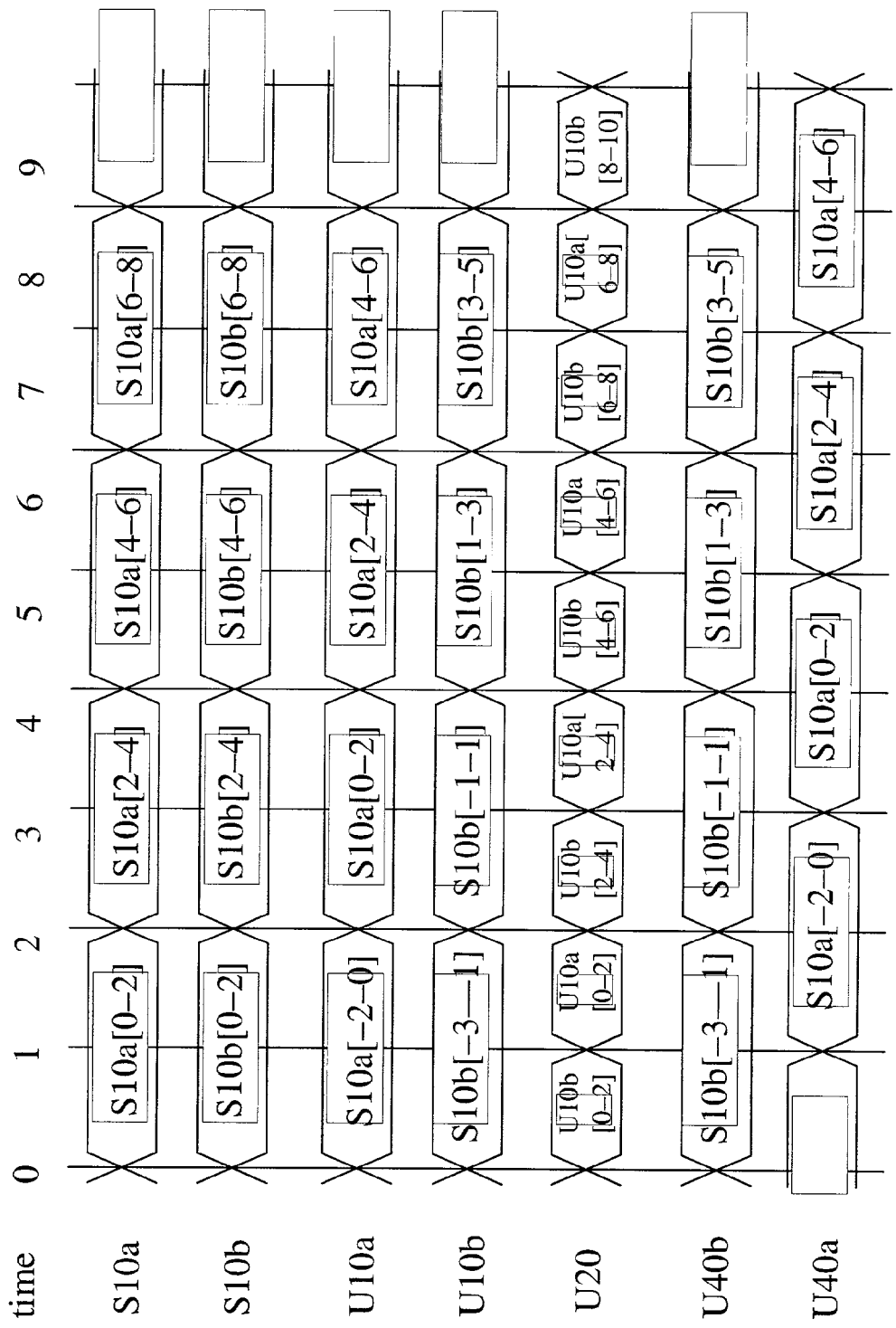
FIG. 15 is a timing diagram of a system as shown in FIG. 14.

Although systems as shown in FIGS. 10 and 13 preserve the desired time relation between the values of the components of the composite signal, a two-tap filter has a relatively poor frequency response, and it may be desirable to obtain better passband response. FIG. 14 shows a system that includes a one-clock-period delay 230 and a four-tap filter 220 according to an embodiment of the invention. Filter 220 produces an output that has a fractional delay (i.e. a delay having an integer portion and a non-zero fractional portion) with respect to the corresponding input signal. In this example, filter 220 has a delay of one-and-one-half clock periods (i.e. a delay having an integer portion of one and a fractional portion of one half). Because of the one-clock-period delay provided by delay 230, the relative time relation between components U10a and U10b is the same as that between components S10a and T10b as shown in FIGS. 10 and 13. In this case, however, a transferred composite signal U30 having frequency characteristics that are more similar to those of the original composite signal may be obtained by virtue of the frequency response of filter 220. FIG. 15 shows a timing diagram for a system as shown in FIG. 14.

Figure 16:
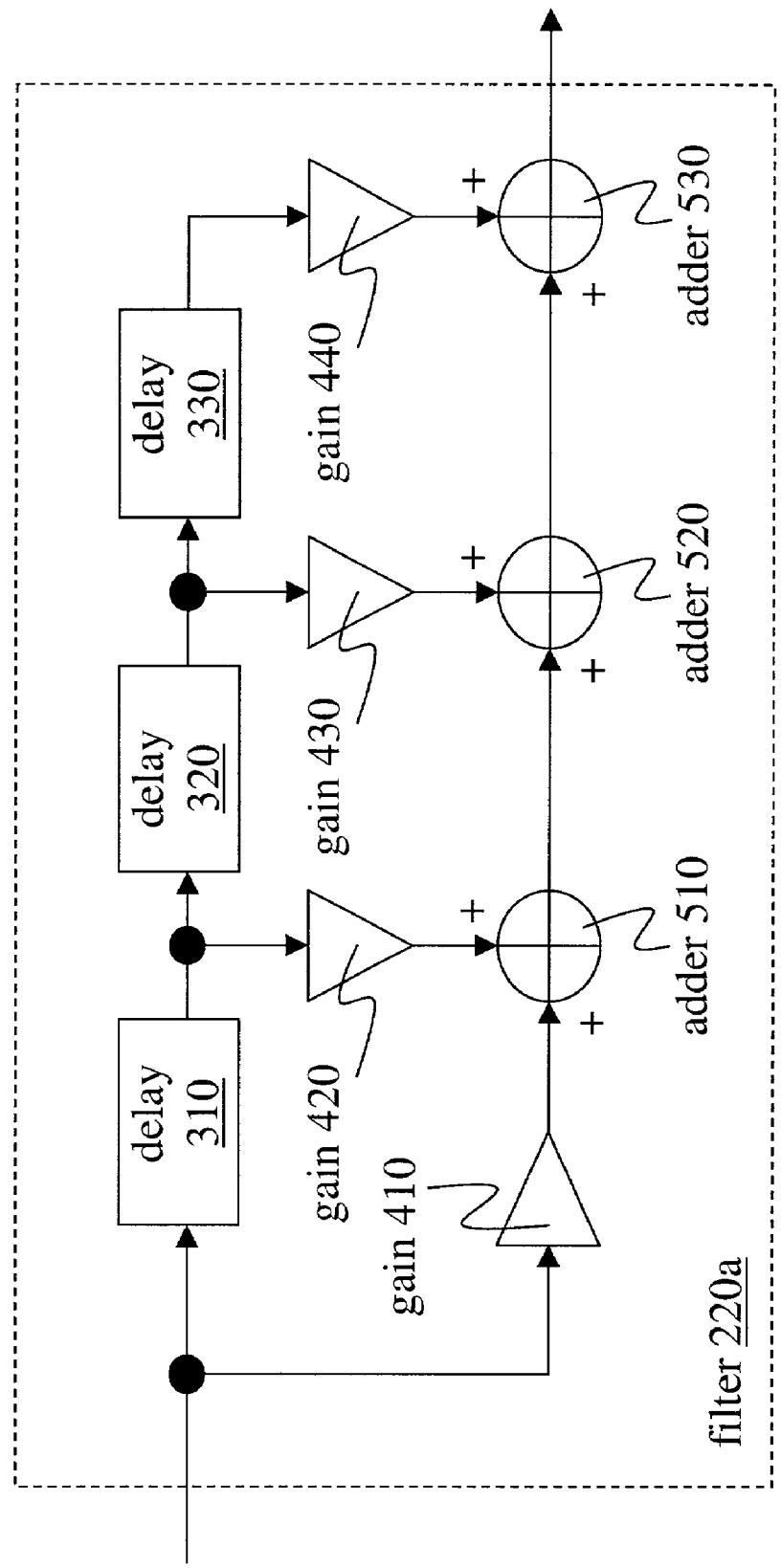
FIG. 16 is a block diagram of an implementation 220a of a filter 220 according to an embodiment of the invention.

FIG. 16 shows one implementation 220a of filter 220 that includes three one-clock-period delays 310, 320, and 330; four gains 410, 420, 430, and 440; and three adders 510, 520, and 530. With assigned values for the factors of gains 410, 420, 430, and 440 of −1/16, +9/16, +9/16, and −1/16, respectively, four-tap FIR filter 220a has linear phase and constant group delay characteristics, with only 0.07 dB of droop in the passband. In an alternate implementation, the polarities of the inputs to adders 510 and 530 from gains 410 and 440, respectively, are inverted, and values of +1/16 (rather than −1/16) are used for the gain factors of gains 410 and 440.

Figure 17:
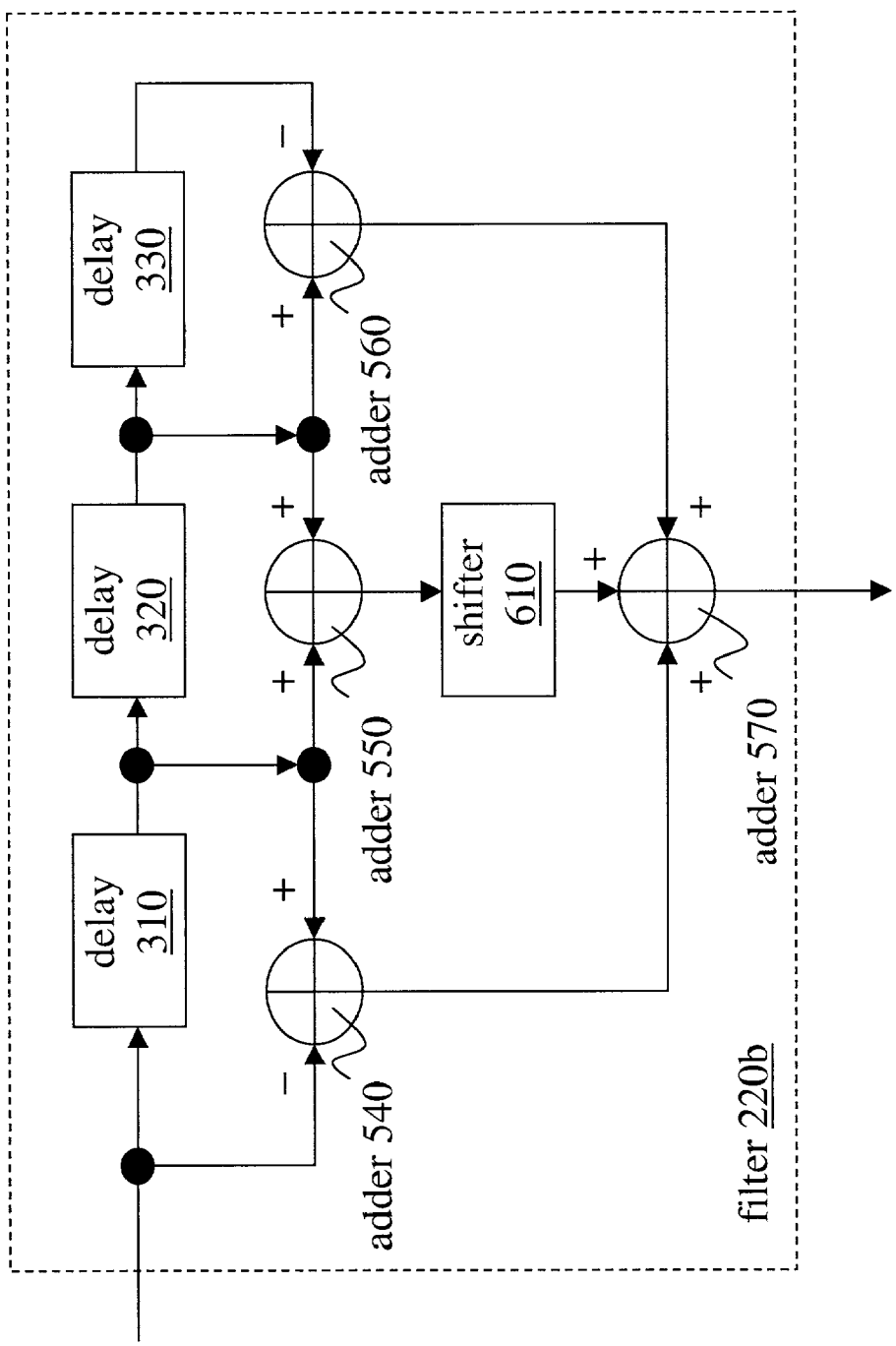
FIG. 17 is a block diagram of an implementation 220b of a filter 220 according to an embodiment of the invention.
Figure 18:
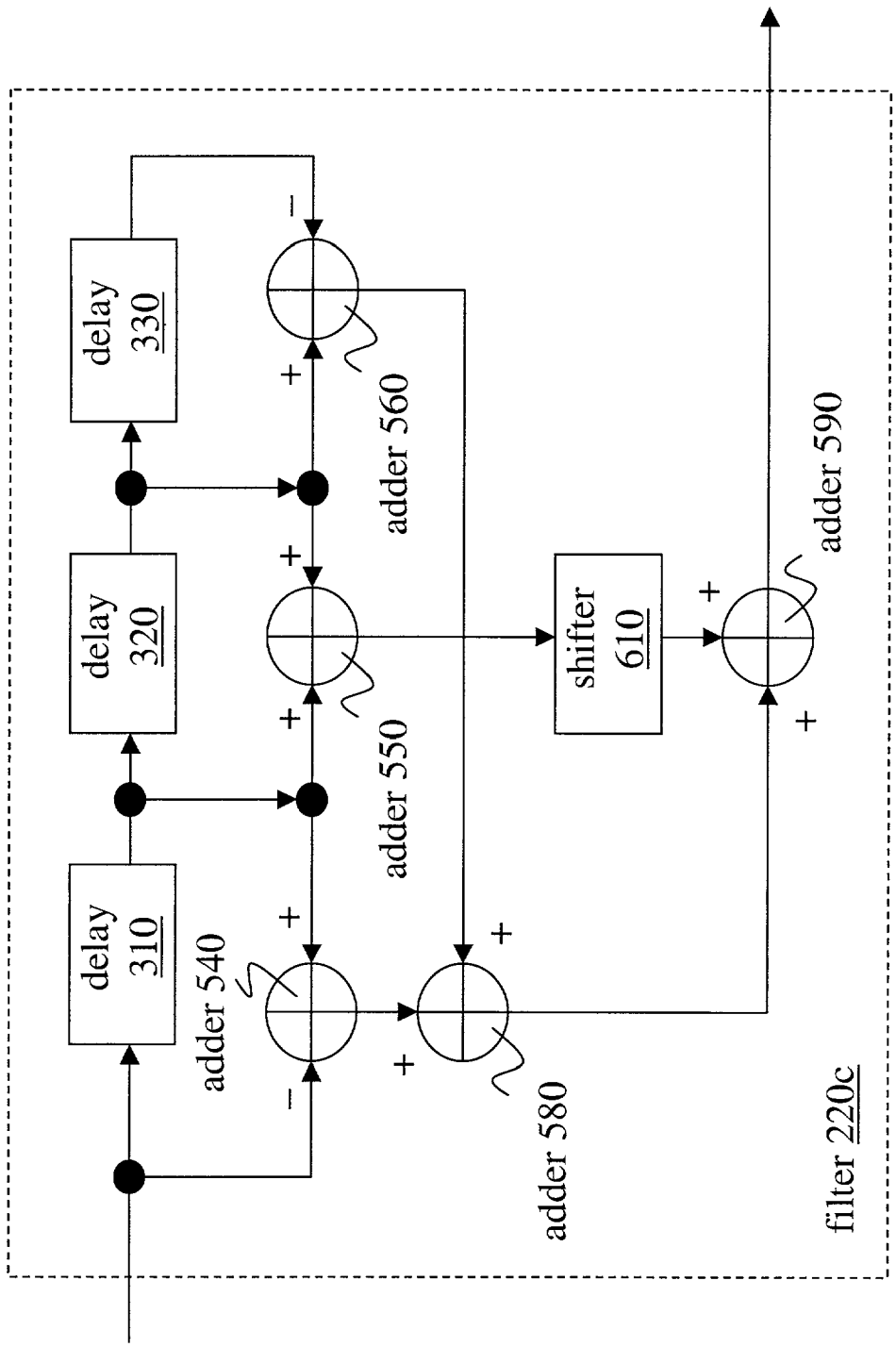
FIG. 18 is a block diagram of an implementation 220c of a filter 220 according to an embodiment of the invention.

FIG. 17 shows another implementation 220b of filter 220 that includes delays 310, 320, and 330; four two-input adders 540, 550, and 560; a three-input adder 570; and a shifter 610. Shifter 610 shifts three zero bits into the value at its input from the right (or least significant) side to effectively multiply the input value by eight. One may easily verify from this figure that the output of adder 570 is the same as the output of filter 220a to within a constant scale factor of sixteen (ignoring any rounding, truncation, or overflow effects). Note that if rounding by truncation is acceptable, the constant factor of 1/16 may be applied to the value outputted by adder 570 by discarding its least significant four bits. FIG. 18 shows another implementation 220c of filter 220 that includes only adders having two inputs (adders 580 and 590 replacing adder 570).

Figure 19:
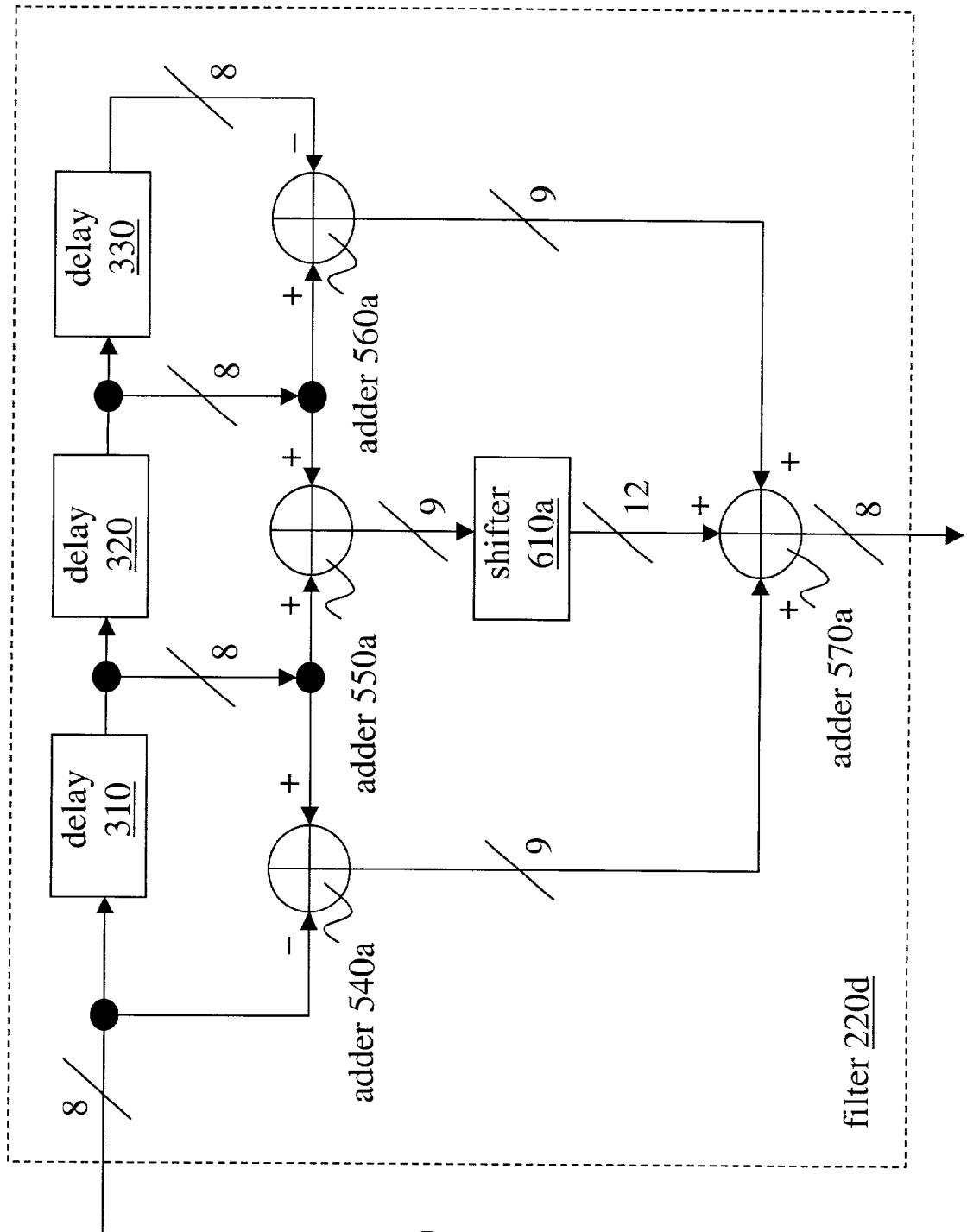
FIG. 19 is a block diagram of an implementation 220d of a filter 220 according to an embodiment of the invention.

FIG. 19 shows another implementation 220d of filter 220 that includes delays 310, 320, and 330; four two-input adders 540a, 550a, and 560a; a three-input adder 570a; and a shifter 610a. In this particular and non-limiting implementation, specific minimum widths (in bits) are indicated for the signal busses between the filter elements. It may be seen that in this example, filter 220d receives an 8-bit-wide input and produces an 8-bit-wide output. One may easily verify from this figure that the output of adder 570a is the same as the output of filter 220a to within a constant scale factor of sixteen (ignoring any rounding, truncation, or overflow effects). If rounding by truncation is acceptable, adder 570a may be implemented to produce a 12-bit-wide output, and the constant factor of 1/16 may be applied by discarding the least significant four bits of the output of adder 570a.

Figure 20:
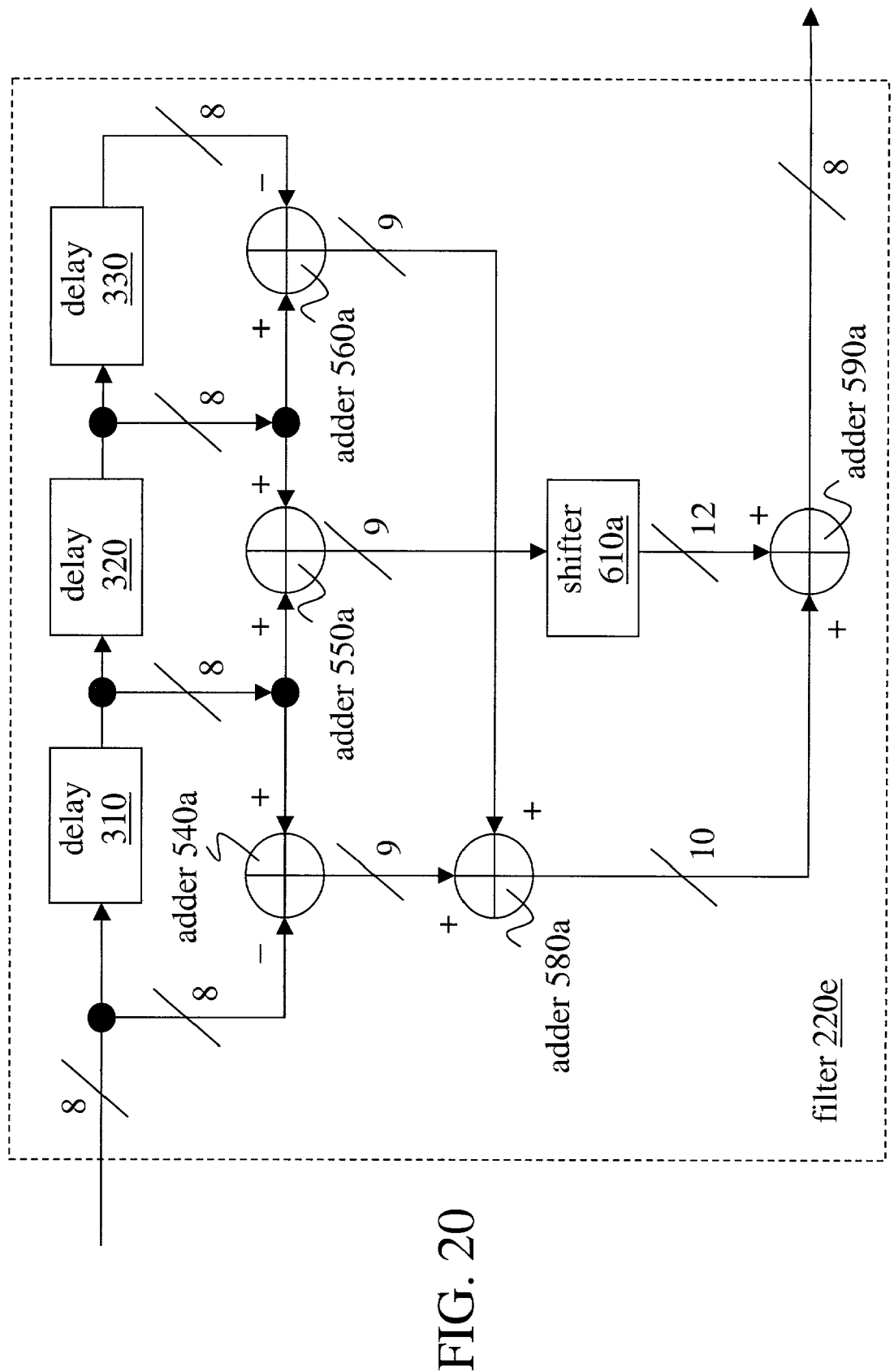
FIG. 20 is a block diagram of an implementation 220e of a filter 220 according to an embodiment of the invention.

FIG. 20 shows another implementation 220e of filter 220 that includes only two-input adders (adders 580a and 590a replacing adder 570a). If rounding by truncation is acceptable, adder 590a may be implemented to produce a 12-bit-wide output, and the constant factor of 1/16 may be applied by discarding the least significant four bits of the output of adder 590a.

In an exemplary implementation in which the input of filter 220 is in offset two's complement representation, the carry bits of adders 540, 550, and 560 (or adders 540a, 550a, and 560a) are set to 1 and adder 590 (590a) saturates to 12 bits. After truncation to 8 bits, the output of a filter according to this implementation will be in offset two's complement representation, which may be converted to offset binary representation by inverting the most significant bit.

The foregoing presentation of the described embodiments is provided to enable any person skilled in the art to make or use the present invention. Various modifications to these embodiments are possible, and the generic principles presented herein may be applied to other embodiments as well.

For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. A filter according to an embodiment as shown in FIGS. 16–20 may also be described or implemented as an array of logic elements (including, e.g., AND, NAND, OR, NOR, NOT, and/or XOR gates) to provide a result as described herein. A device according to an embodiment of the invention may be fabricated as a part of a ball-grid array (having solder-ball terminals), an inline or pin-grid array (having pin terminals), or a similar chip package. Thus, the present invention is not intended to be limited to the embodiments shown above but rather is to be accorded the widest scope consistent with the principles and novel features disclosed in any fashion herein.

What is claimed is:

1. A method of signal processing comprising:
   receiving a composite signal having a first component and a second component, the first component including a series of values, each value of the first component being constant over substantially an entire corresponding one of a series of time periods, the second component including a series of values, each value of the second component being constant over substantially an entire corresponding one of the series of time periods;
   producing a delayed second component based on the second component and having a fractional delay with respect to the second component, the delayed second component including a series of values, each value of the delayed second component being constant over substantially an entire corresponding of the series of time periods;
   multiplexing the delayed second component and the values of a component based on the first component onto a common signal path;
   demultiplexing the values of the delayed second component and the values of the component based on the first component from the common signal path to produce a transferred first component based on the first component and a transferred second component based on the second component; and
   producing a first analog component based on the transferred firs component and a second analog component based on the transferred second component.

2. The method of signal processing according to claim 1, wherein the value of the delayed second component during each of the series of time periods is based on (A) the value of the second component during the time period and the (B) value of the second component during at least one time period adjacent to the time period.

3. The method of signal processing according to claim 1, wherein the series of time periods comprises a series of consecutive time periods of equal duration.

4. The method of signal processing according to claim 3, wherein the fractional delay is measured in durations of a time period and includes an integer portion and a nonzero fractional portion, and
   wherein the fractional portion is at least one-quarter of a time period and no greater than three-quarters of a time period.

5. The method of signal processing according to claim 4, wherein the fractional portion is substantially equal to one-half of a time period.

6. The method of signal processing according to claim 1, wherein a boundary between each of the series of time periods is defined by a transition of a clock signal.

7. The method of signal processing according to claim 6, wherein a duty cycle of the clock signal is substantially equal to fifty percent.

8. The method of signal processing according to claim 1, wherein the values multiplexed onto the common signal path are n bits wide, and wherein the common signal path is less than 2n bits wide.

9. The method of signal processing according to claim 1, wherein the values multiplexed onto the common signal path are n bits wide, and wherein the common signal path is n bits wide.

10. The method of signal processing according to claim 1, further comprising producing a delayed first component based on the first component and having an integer delay with respect to the first component,
wherein multiplexing the values of the delayed second component and the values of a component based on the first component onto a common signal path includes multiplexing the values of the delayed second component and the values of the delayed first component onto a common signal path.

11. A device configured and arranged to output a multiplexed signal based on an original composite signal having a first component and a second component comprising:
a common signal path configured and arranged to carry the multiplexed signal;
a multiplexer configured and arranged to receive (A) a component based on the first component and (B) a delayed second component based on the second component and to produce the multiplexed signal; and
a filter configured and arranged to receive the second component and to produce the delayed second component,
the filter including a shifter configured and arranged to receive an input value and to output a shifted value, wherein the shifted value is equal to $2^i$ times the input value, where i is an integer, and wherein a value of the delayed second component is based on the shifted value.

12. The device according to claim 11, wherein the common signal path includes a plurality of terminals of a chip package that includes the device.

13. The device according to claim 11, further comprising a delay configured and arranged to receive the first component and to output a delayed first component based on the first component,
wherein the multiplexer is configured and arranged to receive the delayed first component.

14. The device according to claim 11, wherein the first component and the second component are synchronous to a clock signal, and wherein a length of a delay of the delayed second component with respect to the second component is measured in durations of a period of the clock signal and includes an integer portion and a nonzero fractional portion, and
wherein the fractional portion is at least one-quarter of a period of the clock signal and no greater than three-quarters of a period of the clock signal.

15. The device according to claim 11, wherein the fractional portion is substantially equal to one-half of a period of the clock signal.

16. A device configured and arranged to output a multiplexed signal based on an original composite signal having a first component and a second component, comprising:
a common signal path configured and arranged to carry the multiplexed signal;
a multiplexer configured and arranged to receive (A) a component based on the first component and (B) a delayed second component based on the second component and to produce the multiplexed signal; and
a filter configured and arranged to receive the second component and to produce the delayed second component,
wherein a transfer function of the filter is expressible as $(-\frac{1}{16})z+(\frac{9}{16})z^{-1}+(\frac{9}{16})z^{-2}+(-\frac{1}{16})z^{-3}$.

17. A system comprising:
a device configured and arranged to output a multiplexed signal based on an original composite signal having a first component and a second component, the device including:
a common signal path configured and arranged to carry the multiplexed signal,
a multiplexer configured and arranged to receive (A) a component based on the first component and (B) a delayed second component based on the second component and to produce the multiplexed signal, and
a filter configured and arranged to receive the second component and to produce the delayed second component;
a demultiplexer configured and arranged to receive the multiplexed signal and to produce a transferred first component based on the first component and a transferred second component based on the delayed second component, the delayed second component being synchronous to the first component and having a fractional delay with respect to the second component; and
a first digital-to-analog converter configured and arranged to produce a first analog component based on the transferred first component and a second digital-to-analog converter configured and arranged to produce a second analog component based on the transferred second component.

18. The system according to claim 17, further comprising a modulator configured and arranged to modulate an in-phase component of a carrier with a component based on the transferred first component and a quadrature component of the carrier with a component based on the transferred second component.

* * * * *